(12) United States Patent
Dutta et al.

(10) Patent No.: US 8,010,121 B2
(45) Date of Patent: Aug. 30, 2011

(54) CHANNEL ALLOCATION FOR WIRELESS MESH NETWORKS

(75) Inventors: Partha Dutta, Bangalore (IN); Sharad Jaiswal, Bangalore (IN); Rajeev Rastogi, Bangalore (IN)

(73) Assignee: Alcatel Lucent, Paris (FR)

( * ) Notice: Subject to any disclaimer, the term of this patent is extended or adjusted under 35 U.S.C. 154(b) by 977 days.

(21) Appl. No.: 11/797,562

(22) Filed: May 4, 2007

(65) Prior Publication Data
US 2008/0159316 A1    Jul. 3, 2008

(51) Int. Cl.
*H04W 4/00*    (2009.01)
(52) U.S. Cl. ......... 455/450; 370/406; 370/376; 370/498
(58) Field of Classification Search .................. 455/450; 370/376, 406, 498
See application file for complete search history.

(56) References Cited

U.S. PATENT DOCUMENTS

2006/0067235 A1 * 3/2006 Acharya et al. ............... 370/238

OTHER PUBLICATIONS

Crescenzi et al. (Crescenzi), "On-line load balancing made simple: Greedy strikes back," Apr. 2003.*
B. Raman, "Channel Allocation in 802.11-based Mesh Networks", in *Proceedings of IEEE Infocom*, Apr. 2006.
B. Raman and K. Chebrolu, "Design and Evaluation of a new MAC Protocol for Long-Distance 802.11 Mesh Networks", in *Proceedings of ACM MobiCom*, Aug. 2005.
B. Raman and K. Chebrolu, "Revisiting MAC Design for an 802.11-based Mesh Network", in *Hot/Nets-II*, Nov. 2004.
P. Bhagwat et al., "Turning 802.11 Inside-Out", *Second Workshop on Hot Topics in Networks (Hot/Nets-II)*, 2003.

* cited by examiner

*Primary Examiner* — Pierre-Louis Desir
(74) *Attorney, Agent, or Firm* — Harness, Dickey & Pierce

(57) ABSTRACT

An example embodiment includes determining a cut of a graph to obtain a bi-partite sub-graph, where the graph represents a plurality of nodes and links between the plurality of nodes in a wireless mesh network. A channel is assigned to the bi-partite graph, and the obtained bi-partite subgraph is removed from the graph. The determining, assigning and removing steps are repeated until the graph has been divided into k bi-partite subgraphs, where k is the number of channels being used for scheduling.

9 Claims, 6 Drawing Sheets

CHANNEL ALLOCATION FOR WIRELESS MESH NETWORKS

FOREIGN PRIORITY INFORMATION

This non-provisional U.S. patent application claims priority under 35 U.S.C. §119 to Indian Provisional Patent Application No. 12/CHE/2007, filed on Jan. 3, 2007, the entire contents of which are incorporated herein by reference.

BACKGROUND OF THE INVENTION

Rural areas in emerging countries and rural areas in general have low penetration of network services, e.g., Internet and cell phone services. In emerging countries, traditional networking and telecommunication services may be too expensive for the average person and/or family. In rural areas, there may not be sufficient interest from potential users to justify the expense in investing in traditional networking and telecommunication infrastructures. Accordingly, the deployment of traditional networking and telecommunication technologies may be prohibitively expensive in these areas.

Recently, IEEE 802.11 WiFi equipment based mesh networks have been proposed as a feasible solution to meet the requirements for rural networks. WiFi equipment is highly commoditized, widely available and inexpensive. In addition, WiFi equipment provides broadband speeds. Directional antenna equipment may send an 802.11 signal over tens of kilometers. Hence, the use of WiFi equipment and directional antenna equipment may be used to span required distances to connect rural areas. IEEE 802.11b equipment offers a peak rate of 11 Mbps, while 802.11g can support up to 54 Mbps.

FIG. 1 illustrates a mesh network 1. For explanation purposes, each node 10 in the rural mesh network may be considered as a town or a village. At least one of the town or village may be a gateway node 20. The gateway node 20 may be connected to the Internet or a telecommunication service provider in a tradition manner. The gateway node 20 may be entry and exit points for all traffic in the mesh network 1.

As illustrated in FIG. 1, the nodes 10 may be connected to each other through point-to-point wireless links using IEEE 802.11 equipment. IEEE 802.11 provides several non-interfering channels for communication, each of the 802.11b and g variants has 3 channels, and the 802.11a variant has 12 channels. Some nodes 10 may connect directly to the gateway node 20, and other nodes 10 may connect to the gateway node 20 through one or more hops in the mesh network 1. The distance between the nodes 10 may be in the order of 10-15 km. In order for a signal to traverse this distance, high-gain directional antennas may be used at the end-points of a link. The high-gain directional antennas may be mounted on towers to establish a line of sight with other high-gain directional antennas.

While directional antennae are designed to transmit and receive in a specific direction, the directionality of the signals become more effective at distances further away from the sending point, which is known as the near field effect. Due to the near field effect, adjacent links at a node 10 may interfere with each other in certain communication modes.

As illustrated in FIG. 2, at any one of the nodes 10, simultaneous transmission (Tx) and reception (Rx) on the same channel is not possible, because the transmission will interfere with the reception and vice versa. This is known as Mix-Rx-Tx interference. To avoid the Mix-Rx-Tx interference, while keeping a set of links active on the same channel, requires that a constraint be imposed on the set of active links. Roughly stated the network is conceptually divided into two sub-networks such that links exist between nodes in different sub-networks but not between node in a same subnetwork.

The constraint is stated more precisely using the language of mathematical graph theory. A mesh network having nodes interconnected by links may be represented by a graph. In the context of graph theory, another name for a node is a vertex. A connection between two nodes (or vertices) is referred to as an edge (or link as used above). In the language of graph theory, the constraint referred to above is the graph indicated by active links is bi-partite. A bi-partite graph may be defined as a set of graph vertices decomposed into two disjoint sets such that no two graphs vertices within the same set are adjacent (i.e., connected). For example and with reference to FIG. 3, assume there are nodes u, v, w and x in a mesh network. The mesh network may be represented by a graph G. The nodes may be partitioned into two subsets B1={u, v} and B2={w, x}. To avoid Mix-Rx-Tx interference, the graph G should be bi-partite. For example, no nodes in subset B1 may be connected to each other. However, a node in subset B1 may be connected to one or more nodes in subset B2. As stated above, a connection between two (2) nodes is known as an edge or link.

Consider a subgraph of a mesh graph that is induced by active links at a given instant. To avoid Mix-Rx-Tx interference, every node must be either transmitting on all incident links or receiving on all incident links. In other words, no two transmitting nodes (and no two receiving nodes) may be neighbors (i.e., connected). It follows that, no two nodes may transmit to each other (and receive from each other) at the same time. Therefore, the subgraph is bi-partite.

Although Mix-Rx-Tx interference prevents simultaneous Tx and Rx at a node 20, a node 20 may synchronously transmit (or synchronously receive) on all incident links. This is called a SynTx (or SynRx). The SynTx/SynRx is known as a SynOp: synchronous operation of links at a node.

In the conventional art, a 2-Phase (2-P) medium access control (MAC) protocol based on SynOp has been proposed. The protocol operates on a bi-partite graph by switching each node between two phases: SynRx and SynTx. With reference to FIG. 3, let B1 and B2 be the two independent sets of nodes in a bi-partite graph. To start its transmission, a node v in B1 waits for all neighbors in B2 to complete their transmissions. Then, v transmits to all neighbors in B2. (The algorithm for a node in B2 is symmetric.) In other words, when a node switches from SynRx to SynTx, its neighbors switch from SynTx to SynRx, and vice versa.

Given a single channel, the 2P protocol is restricted to operate only on a bi-partite graph. However, if multiple (non-interfering) channels are available, the 2P protocol may operate on multiple bi-partite graphs using a different channel for each bi-partite graph.

The 2P protocol has a constraint on the fraction of time links are active in a given direction. For example, for the 2P algorithm on a bi-partite subgraph (two independent sets B1 and B2) and operating on a single channel, a link is always active in one direction or the other. Then the fraction of time a link is active in a given direction (from B1 to B2) must be identical for all links. Otherwise, if any two links are active for different fractions of time from B1 to B2, then, as every link is always active in one direction or the other, this difference in fractions propagates through the graph; and gives rise to different fractions at some pair of adjacent links. However, as illustrated in FIG. 3, different fractions at two adjacent links cause Mix-Rx-Tx interference at the common node.

Accordingly, in the P2 protocol all links within a bi-partite subgraph (on the same channel) should be active for the same fraction of time in either direction. If several channels are available, and the given network graph is partitioned into bi-partite subgraphs, then, the 2P protocol may run on a separate channel on each bi-partite subgraph, and different subgraphs can have different fractions.

SUMMARY OF THE INVENTION

Example embodiments of the present invention provide a method of allocating channels in a wireless mesh network.

The method of channel allocation in a wireless mesh network may include determining a cut of a graph to obtain a bi-partite sub-graph, where the graph represents a plurality of nodes and links between the plurality of nodes in a wireless mesh network. A channel is assigned to the bi-partite graph, and the obtained bi-partite subgraph is removed from the graph. The determining, assigning and removing steps are repeated until the graph has been divided into k bi-partite subgraphs, where k is the number of channels being used for scheduling.

BRIEF DESCRIPTION OF THE DRAWINGS

Example embodiments of the present invention will become more fully understood from the detailed description given herein below and the accompanying drawings, which are given by way of illustration only and thus are not limiting of the example embodiments of the present invention.

DETAILED DESCRIPTION OF EXAMPLE EMBODIMENTS

Figure 1:
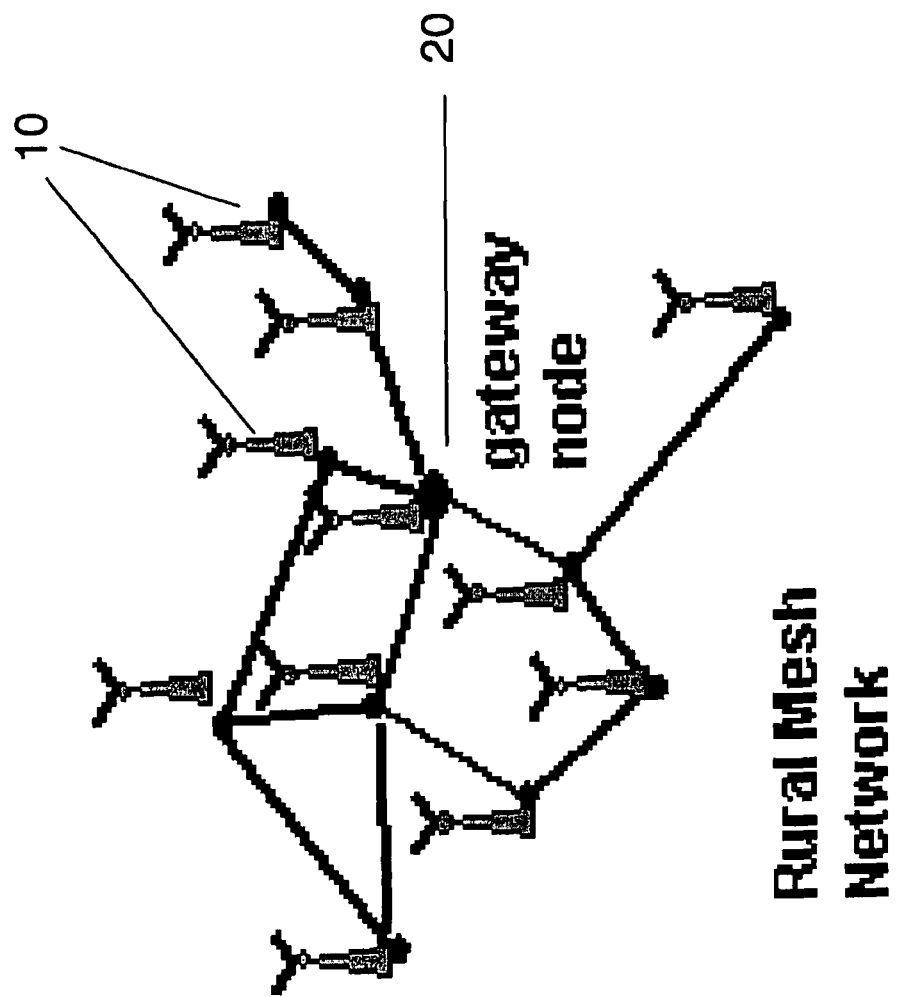
FIG. 1 illustrates a Rural Mesh Network used to explain example embodiments of the present invention.
Figure 2:
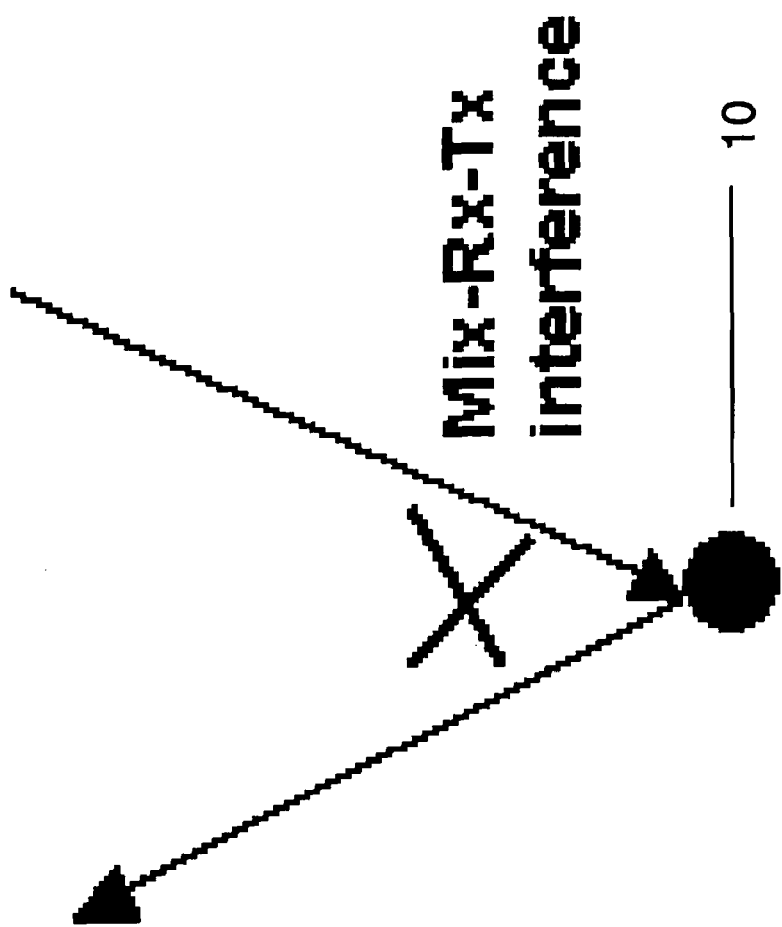
FIG. 2 illustrates Mix-Rx-Tx interference at a node of the Rural Mesh Network of FIG. 1.

Example embodiments of the present invention will be described using a Rural Mesh Network, but it will be apparent to a person of ordinary skill that the example embodiments of the present invention may be used in other types of networks, for example but not limited to, wireless metropolitan area networks (WMAN), wireless local area networks (WLAN), wireless personal area networks (WPAN), etc.

Covering Input Graph with Bi-Partite Subgraphs

For purposes of explanation, assume there is a Rural Mesh network, for example, represented by a network graph G=(V, E) having a set of source-destination demands D and k non-interfering 802.11 channels. Given that only a bi-partite subgraph may be activated for a given channel, it follows that with k channels, only k bi-partite subgraphs may be simultaneously activated. To determine the k bi-partite subgraphs, a cut algorithm may be applied to the network graph G. A cut is a partition of the vertices (nodes) of the network graph G into two (2) subsets, and the size of the cut is the number of edges crossing the cut.

It is known that the largest bi-partite subgraph presented in the network graph G may be obtained by computing the maximum cut (max-cut) of the network graph G. The cut is considered maximal if the size of the cut is not smaller than the size of any other cut. Using max-cut to obtain bi-partite subgraphs, all edges of the network graph G may be covered by selected k bi-partite subgraphs provided that the number of incident edges on any node is at most $2^k-1$. In addition, if the network graph G is not covered by the selected k bi-partite subgraphs, then a guarantee is provided on the fraction of every demand that can be satisfied by operating 2P protocol on the selected subgraphs. In other words, if (a) demands are symmetric (for any pair of nodes, the demands in both directions are equal), (b) $\lambda$ fraction of every demand may be met if all links of G could have been operated, and, (c) the maximum cut of a graph may be found, then the selected k bi-partite subgraph may satisfy at least $(2^k\lambda)/(2^k+\log(E))$ fraction of every demand. Here, E is the number of edges of the network graph G.

As disclosed above, given the network graph G, a cut of network graph G defines a bi-partite subgraph of the network graph G. Further, to best meet demands of the nodes, the largest possible bi-partite graphs may be selected using max-cuts. Currently, we are unaware of a well-known efficient algorithm for obtaining max-cuts. Accordingly, any well-known approximation algorithm may also be used. For example, in one embodiment a well known local search based ½ approximation algorithm of max-cut (i.e., an algorithm that finds a cut which is at least half the size of a max-cut) may be used (e.g., See Approximation Algorithms, V. Vazirani, Springer, 2004]. Hereafter, we call this approximation cut algorithm LS-cut. The bi-partite subgraphs of network graph G that corresponds to k channels are obtained, as follow:

Apply the LS-cut algorithm on the network graph G to obtain a first bi-partite subgraph.

Remove the first bi-partite subgraph from the network graph G, and again apply the LS-cut algorithm on the remaining network graph G to obtain a second bi-partite subgraph.

The process is repeated k times to obtain the k bi-partite subgraphs.

Figure 4:
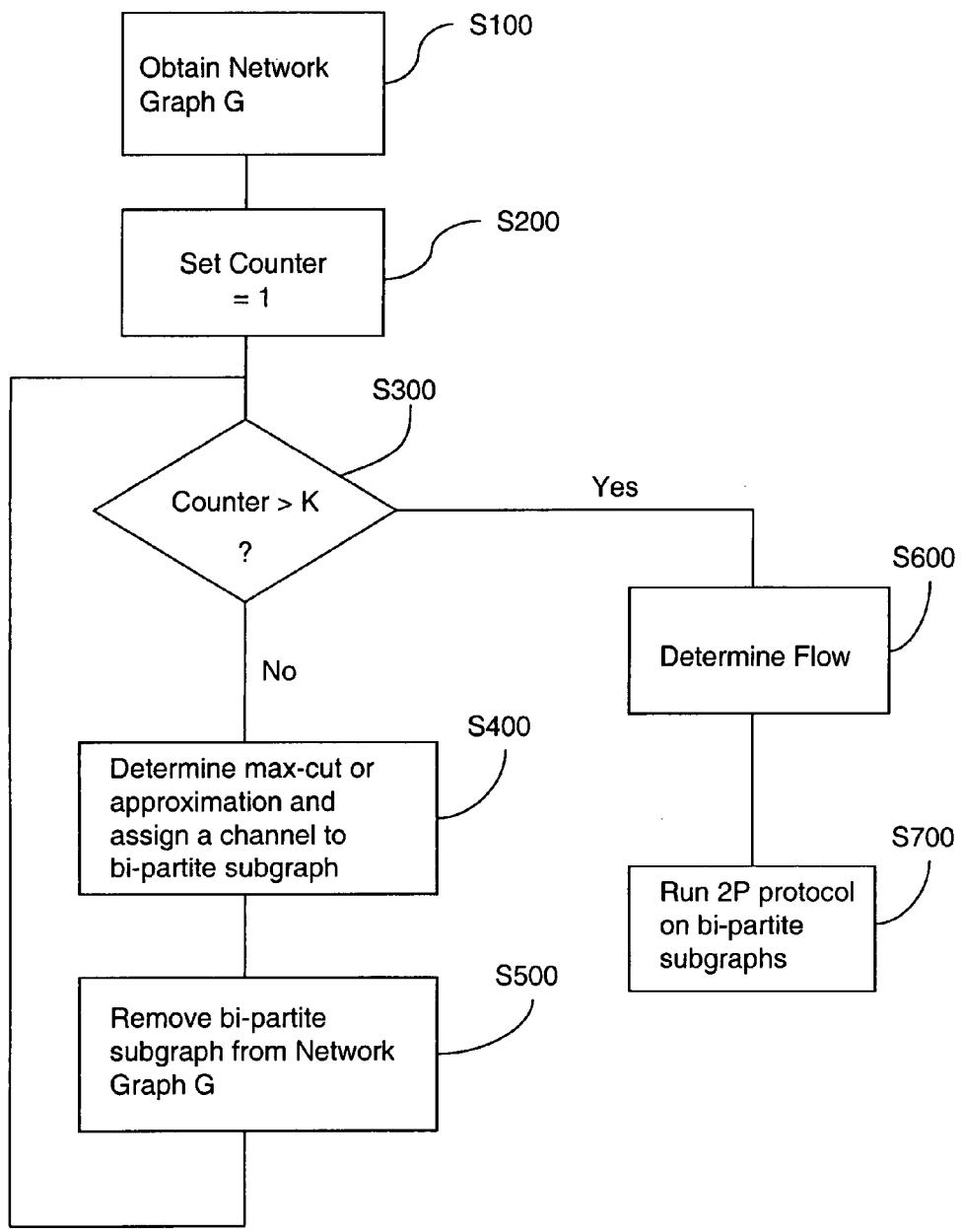
FIG. 4 is a flow diagram illustrating a method of channel allocation on a rural mesh network using example embodiments of the present invention.

Obtaining bi-partite graphs using LS-cuts in this manner has the desirable property that, all edges of the network graph G may be covered by selected k LS-cuts provided that the number of incident edges on any node is at most $2^k-1$. With reference to FIG. 4, a method of determining bi-partite subgraphs will be described. In step S100 a mesh network graph G is determined. For example, in graph G the nodes may be villages, and there are links between any two villages than can directly communicate with each other using high-gain directional antenna and WiFi equipment (i.e., within 10-15 km of each other). In step S200, a counter is set to equal 1. In step S300, it is determined whether the counter is greater than k, where k=the number of channels for scheduling. If the counter is less than k, then the method moves to step S400. In step S400, an LS-cut algorithm is applied to the mesh network graph G to obtain a first bi-partite subgraph (e.g., represented by singles lines in FIG. 5), which is assigned channel 1. In step S500, the first bi-partite subgraph is removed from the mesh network graph G. The method returns to S300, and again it is determined whether counter is greater than k. If the counter is still less than k, steps S400 and S500 are repeated. For each repetition, another of the k channels is assigned or allocated to a respective bi-partite subgraph.

Returning to step S300, if the counter is greater than k, then the method moves to step S600, where a flow (i.e., the routing for each demand) to maximize (satisfied) demands may be obtained by running a standard linear programming. In step S700, the 2P protocol is simultaneously run on each bipartite subgraphs using the assigned channels to schedule which links are active in a given direction.

Asymmetric Demands

If demands are asymmetric, (i.e., the demands between two nodes are different in two directions) then a routing algorithm may assign different loads to the two directions of a link, and therefore, different fractions to links in the same bi-partite subgraph may be assigned. However, the 2P protocol requires that the links in the same bi-partite subgraph should have identical fractions. Assigning identical fraction to all links in the same bi-partite graph may reduce the routed flows, and in turn, reduce end user throughput.

Figure 3:
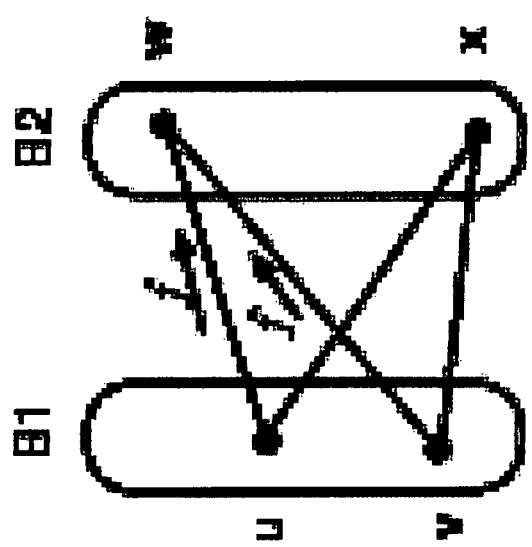
FIG. 3 illustrates how different fractions on adjacent links may cause Mix-Rx-Tx interferences.
Figure 3:
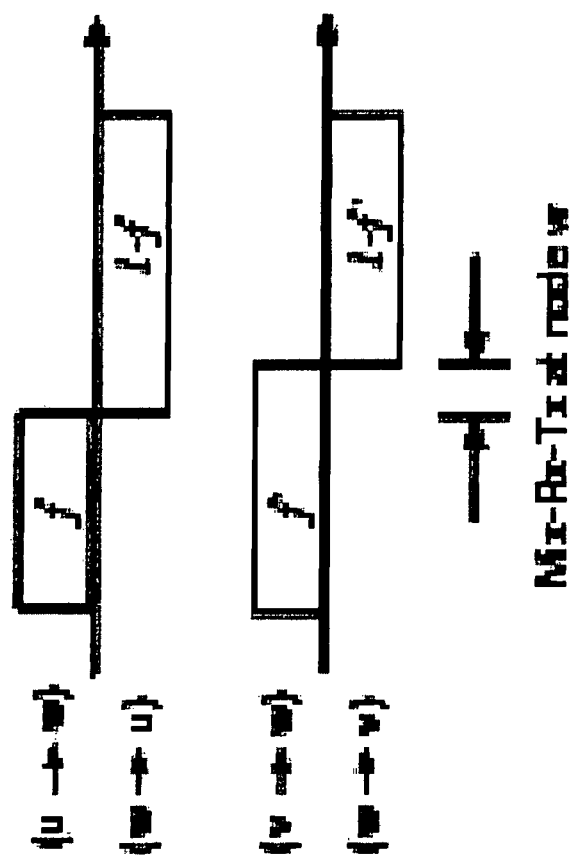

Even if a link is assigned different loads in two directions, and if the total load in both directions is less than the capacity of the link, then there is an interval of fractions that satisfies the loads in both directions. As discussed above, the 2P protocol has a constraint on a fraction of time links are active in a given direction. With reference to FIG. 3, recall that the 2P protocol operates on a bipartite graph, for example {B1, B2}. In the bipartite graph {B1, B2}, where B1 and B2 are set of nodes, all links/edges of the graph are between nodes in B1 and nodes in B2. In other words, there are no links between any two nodes in B1, or any two nodes in B2. The 2P protocol requires that a fraction of time a link is active in a given direction (e.g., from B1 to B2) must be the same for all links in {B1, B2}.

For example, assume the 2P protocol is run on the bipartite graph {B1, B2} on channel 1. Also, assume that there is a link in the bipartite graph {B1, B2} between node v in B1 and node w in B2 (denoted by (vw)), with a total capacity of 11 Mbps (i.e., the sum of the data rates in both directions of the link cannot be more than 11 Megabits per second). As will be recalled, flow is an assignment of data rates in both directions of every link. For purposes of discussion, assume that the flow to maximize (satisfy) demands provides assigned rates of 3 Mbps from v to w, and 5 Mbps from w to v. A fraction for this link is $3/11$ (in direction B1 to B2). Then, the 2P protocol requires that all links in {B1, B2} should be active in the direction from B1 to B2 for $3/11$ fraction of the time (i.e., all links may be active for $8/11$ fraction in the direction from B2 to B1). Here, $3/11$ is the fraction assigned to the bipartite graph.

The above requirements for the 2P protocol may be relaxed. For the above example, because 5 Mbps is the requirement from w to v, any fraction between $3/11$ and $6/11$ may be assigned as the rate from v to w. The range [$3/11$, $6/11$] is called the interval for link (u,v). Thus given the intervals for all links in {B1, B2}, if there may be at least one common fraction in those intervals, one of those common fractions may be assigned to {B1, B2} to satisfy the rates of all the links. However, if there is no common fraction, then some links should be reassigned to other bipartite graphs. The reassignment may be performed as described below. (Note that the reassignment problem arises only for asymmetric demands. For symmetric demands the rates required in the two directions of a link are equal, and all fractions are $1/2$.)

The links may be reassigned by using a greedy technique. There are two tunable parameters in the greedy technique, an integer q and a small positive number e, which have typical values of 5 and 0.1, respectively).

We start with k bipartite subgraphs, and the intervals for all links. The median interval M of a bipartite subgraph G' is an interval such that the number of links in the bipartite subgraph G' with intervals higher than M is equal to the number of links in the bipartite subgraph G' with intervals lower than M. (M may be found by ordering the link intervals in G'.) The cost of a link in the bipartite subgraph G' is determined to be the distance between the interval of the link and median interval M. The total cost is the sum of the costs of all edges. For example purposes only, a greedy algorithm may be as follows:

--- while (old total cost − new total cost > e) do the following
{
  let S be the set of q links with highest costs in the whole graph;
  let BG be the set of k bipartite subgraph;
  for every assignment of links in S to bipartite subgraphs in BG do the following
  {
    if all subgraphs in BG remain bipartite after this assignment, calculate the total cost;
  }
  select the assignment with the lowest total cost and update the bipartite subgraphs in BG accordingly;
  calculate the new total cost after the assignment;
}
Note: An assignment moves links to bipartite graphs. An example of all assignments where the set of links is S = {a,b}, and the set of bipartite graphs is BG = {G1, G2} is as follows:
1. move both a and b to G1
2. move both a and b to G2
3. move a to G1 and b to G2
4. move b to G1 and a to G2

---

On termination of the greedy algorithm, the midpoint of the median interval of each bipartite subgraph is assigned as the fraction for that subgraph. This will give new capacities for each direction of a link. For example, if the total capacity of every link in bipartite subgraph {B1, B2} is 11 Mbps, and the subgraph is assigned a fraction=$4/11$ after running the above greedy algorithm, then the capacity of every link in {B1, B2} is 4 Mbps in the direction B1 to B2, and 11−4=7 Mbps in the reverse direction. The routing based on new capacities is recomputed.

Channel Allocation

Figure 5:
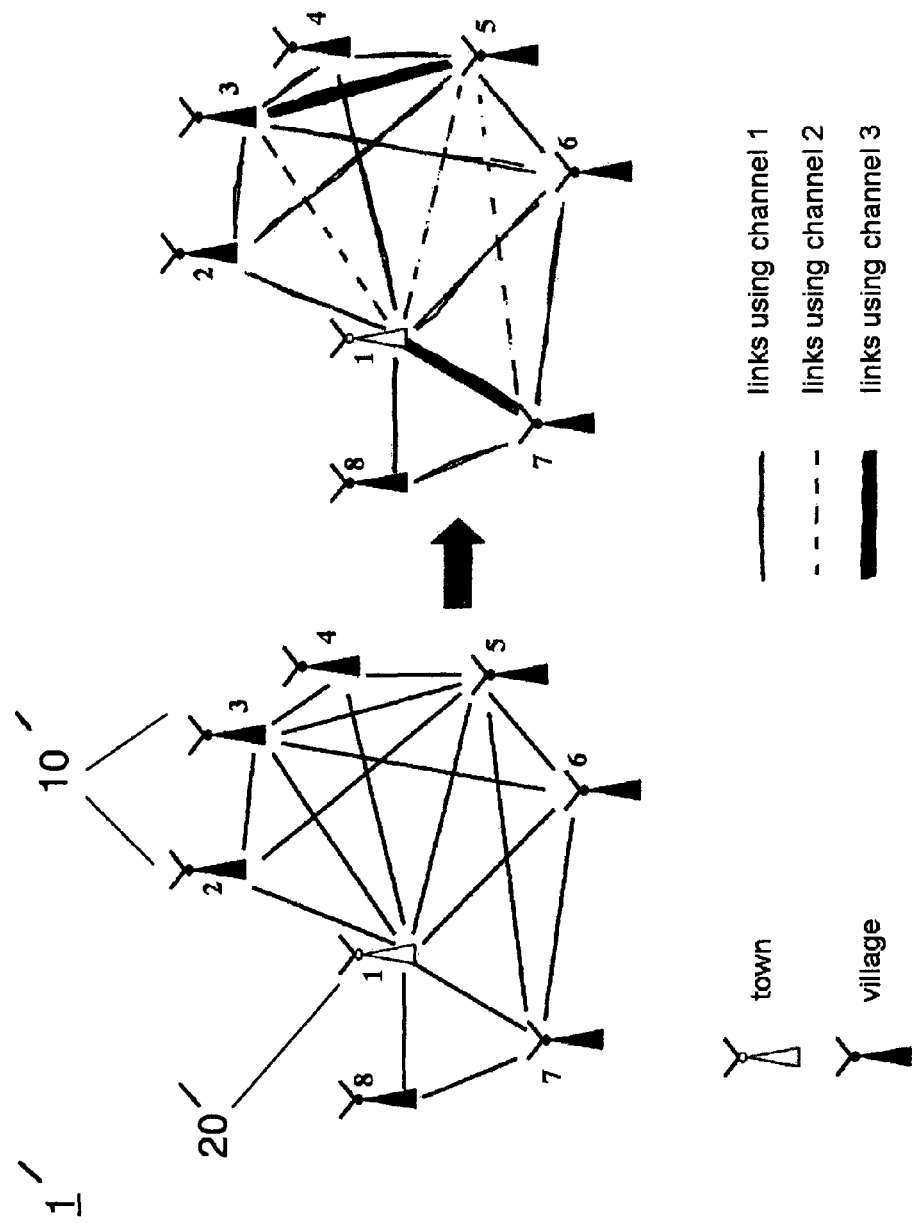
FIG. 5 illustrates channel allocation on a rural mesh network using example embodiments of the present invention.

With reference to the example in FIG. 5, a mesh network 1' may have a cluster of seven (7) nodes 10' surrounding a gateway node 20' connected to, for example, a broadband internet connection. The gate node 20' has IEEE 802.11b network equipment, which has 3 non-interfering channels, and directional antennas mounted on towers to span WiFi signals between the nodes. Each of the nodes 10' is directly connected to at most 7 other nodes 10' (in graph theoretic terms, each node in this graph has a maximum degree of 7). Then, using the algorithm of example embodiments of the present invention, all links in this graph are assigned one of the 3 non-interfering channels, and the subgraphs formed by links on a particular channel are bi-partite. The 2P protocol on the entire network graph G may be run to ensure 100% utilization of all links in the graph, which will connect all nodes 10' to the gateway node 20' and hence to the Internet or some other network.

With reference to FIGS. 4 and 5, a first LS-cut algorithm is applied to obtain a first bipartite subgraph (represented by single lines in FIG. 5), which is assigned channel 1. A second LS-cut is applied to the network graph G after removing the first bipartite subgraph to obtain a second bipartite subgraph (presented by dotted lines in FIG. 5), which is assigned channel 2. A third LS-cut is applied to the network graph G after removing the second bipartite subgraph to obtain a third bipartite subgraph (presented by dark lines in FIG. 5), which is assigned channel 3.

In the Rural Mesh Network 1' of the example embodiment, each node 10' has a mesh router 30. Given a network graph G, each mesh router 30 computes which of its incident links should be activated using the algorithm of the example embodiments, and uses only the activated links for routing.

Figure 6:
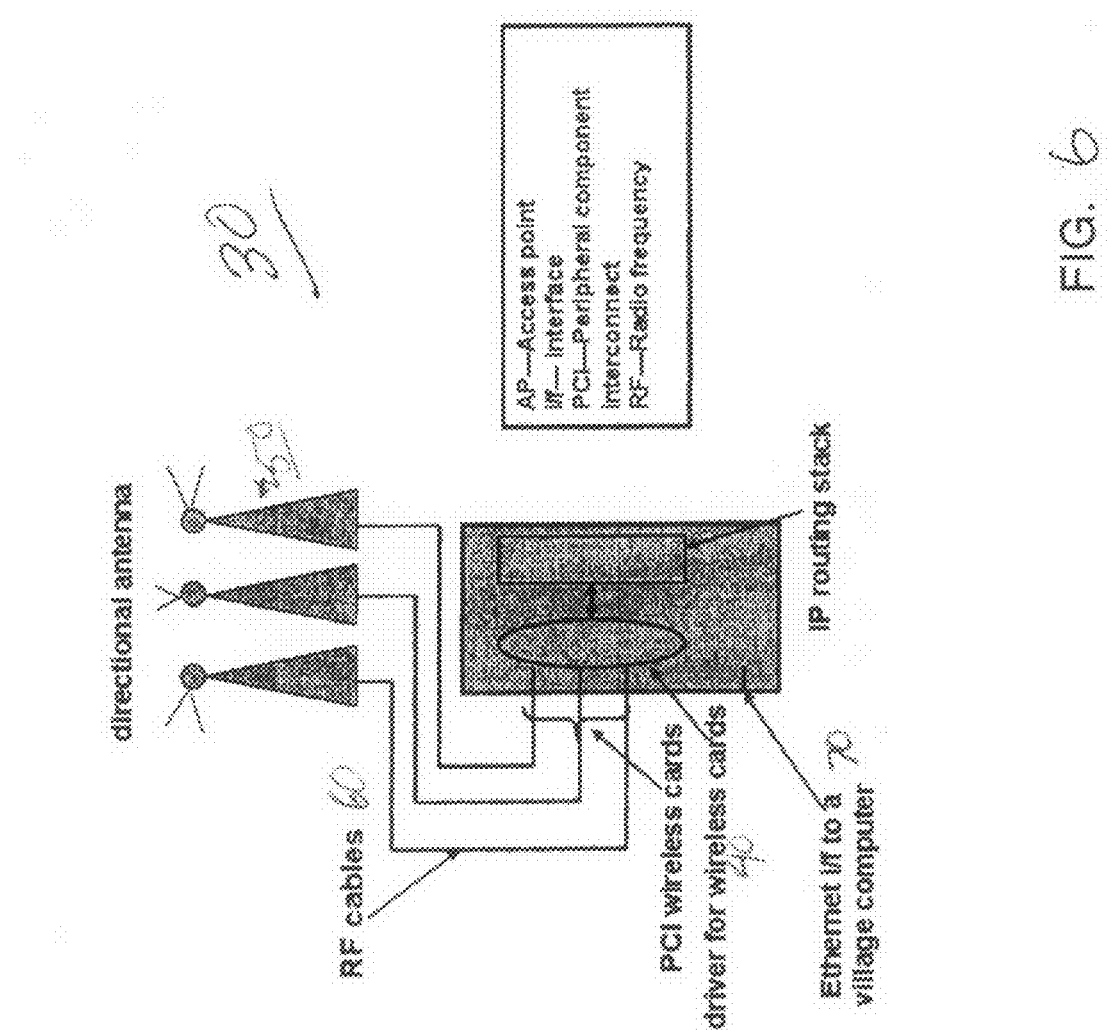
FIG. 6 illustrates a mesh router, which may be used in the example embodiments of the present invention.

As illustrated in FIG. 6, the mesh router 30 may contain the IEEE 802.11 wireless communication equipment and the protocols to run it. For example, the mesh router 30 may be a Linux-based personal computer. An 802.11 radio may be associated with each point-to-point link adjacent on a node 10. The radio may be peripheral component interconnect (PCI) 40 or Personal Computer Memory Card International Association (PCMCIA) WiFi card. Open-source drivers may be used to operate these cards, and open source Internet Protocol (IP) routing stack may be used to route within a mesh network. The 802.11 radios may be connected to a directional antenna 50 mounted on a tower via RF cables 60, and an Ethernet interface 70 may route traffic destined for a local node 10 to a gateway node 20.

Wireless mesh networking is a fast growing technology, and example embodiments of the present invention may be used to build municipal area networks and long-distance networks for extending Internet and telecommunication connection in rural regions.

Example embodiments of the present invention being thus described, it will be obvious that the same may be varied in many ways. For example, it is understood that the above-described Rural mesh Network may be directed to any type of wireless networking, including but not limited to wireless metropolitan area networks (WMAN), wireless local area networks (WLAN), wireless personal area networks (WPAN), etc.

Such variations are not to be regarded as a departure from the spirit and scope of the exemplary embodiments of the invention, and all such modifications as would be obvious to one skilled in the art are intended to be included within the scope of the invention.

What is claimed is:

1. A method of channel allocation in a wireless mesh network, comprising:
    determining, by a gateway, a cut of a graph to obtain a mesh bi-partite subgraph, the graph representing a plurality of nodes and links between the plurality of nodes in the wireless mesh network;
    assigning, by the gateway, a channel to the mesh bi-partite subgraph;
    removing, by the gateway, the obtained mesh bi-partite subgraph from the graph; and
    repeating, by the gateway, the determining, assigning and removing steps until the graph has been divided into k mesh bi-partite subgraphs, where k is the number of channels being scheduled;
    scheduling, by the gateway, different flows over the links between the plurality of nodes in each mesh bi-partite subgraphs based on demands from the plurality of nodes, wherein if the demand is asymmetric, the gateway reassigns the links in the mesh bi-partite subgraphs based on intervals of the links and median intervals of the links in each mesh bipartite subgraph, wherein the interval of the link is a range of allowed fraction of a capacity of the link;
    bi-partite subgraphs based on demands from the plurality of nodes.

2. The method of claim 1, further comprising:
    scheduling, by the gateway, the mesh bi-partite subgraphs on the k channels.

3. The method of claim 2, wherein the scheduling is performed by a 2-Phase (2-P) medium access control (MAC) protocol.

4. The method of claim 2, further comprising:
    determining, by the gateway, flows over the links between the plurality of nodes in each mesh bi-partite subgraphs based on demands from the plurality of nodes.

5. The method of claim 4, wherein the flow is determined by running a linear program.

6. The method of claim 4, wherein if the demand is asymmetric, the determining flows step performs a greedy algorithm to re-assign links to the mesh bi-partite subgraphs.

7. The method of claim 1, further comprising:
    determining, by the gateway, flows over the links between the plurality of nodes in each mesh bi-partite subgraphs based on demands from the plurality of nodes.

8. The method of claim 7, wherein the flow is determined by running a linear program.

9. The method of claim 7, wherein if the demand is asymmetric, the determining flows step performs a greedy algorithm to re-assign links to the mesh bi-partite subgraph.

* * * * *

UNITED STATES PATENT AND TRADEMARK OFFICE
CERTIFICATE OF CORRECTION

PATENT NO. : 8,010,121 B2
APPLICATION NO. : 11/797562
DATED : August 30, 2011
INVENTOR(S) : Partha Dutta et al.

It is certified that error appears in the above-identified patent and that said Letters Patent is hereby corrected as shown below:

Title Page, below Item (65) insert:

-- Foreign Application Priority Data

Jan. 3, 2007 (IN) ....................... 12/CHE/2007 --

Signed and Sealed this
Third Day of January, 2012

David J. Kappos
*Director of the United States Patent and Trademark Office*